March 25, 1941.  W. T. REA  2,236,157
CONTACT CHATTER MEASURING DEVICE
Filed June 30, 1939
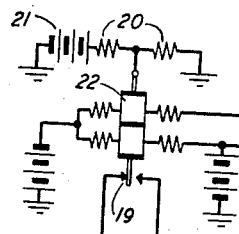
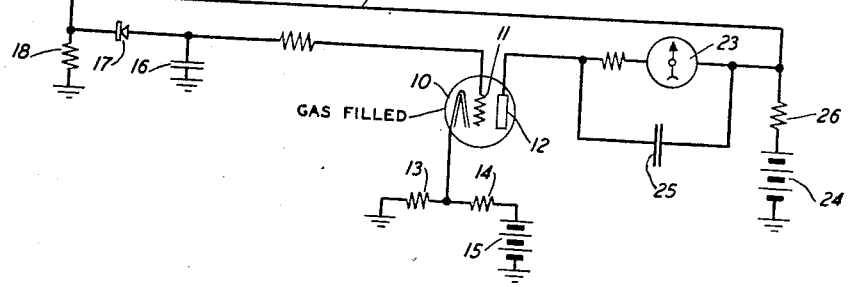
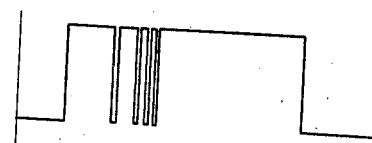
FIG. 2
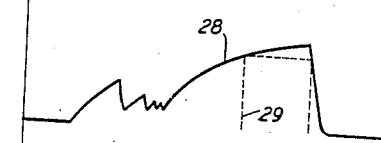
FIG. 3
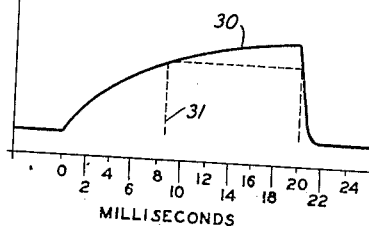
FIG. 4
INVENTOR
W. T. REA
BY
W. F. Simpson
ATTORNEY Patented Mar. 25, 1941

2,236,157

UNITED STATES PATENT OFFICE 2,236,157

CONTACT CHATTER MEASURING DEVICE

Wilton T. Rea, Bayside, N. Y., assignor to Bell Telephone Laboratories, Incorporated, New York, N. Y., a corporation of New York Application June 30, 1939, Serial No. 282,023

4 Claims. (Cl. 175—183)

This invention relates to measuring devices and more particularly to an arrangement for measuring the duration of contact chatter and rebound in relays.

Various systems have been proposed for measuring the length of time required for a relay to operate, as, for example, the system disclosed in U. S. Patent 1,765,585, J. Herman, June 24, 1930 or for counting the number of times the contacts momentarily open and reclose when a relay is operated or released, as, for example, the system disclosed in U. S. Patent 1,677,157, A. Weaver, July 17, 1928. However, none of these arrangements is capable of measuring or giving any accurate indication of the duration of the contact chatter or rebound.

It is an object of this invention to accurately measure the length of time of the contact chatter or rebound.

The length of time that the contacts continue to chatter and rebound, i. e., momentarily open and reclose, is of considerable importance in certain circuits, such as circuits for the transmission of telegraph signaling impulses, where the contact chatter will affect the wave shape and thus the distortion of the transmitted or repeated signals.

In most of the contact measuring circuits, it has been necessary to provide more than one contact, that is, one contact for measurement purposes and one or more contacts for control purposes. It is an object of the present invention to provide a contact measuring circuit which is automatically reset and which requires connections to only the contact which it is desired to measure.

A feature of this invention relates to the use of a rectifier in the charging or discharging circuit of a condenser. The rectifier is so connected that the charge on a condenser can be altered very rapidly when it is changed in one direction but varies quite slowly when it is changed in the other direction. Thus, if the circuit is arranged to rapidly charge the condenser, the condenser will discharge very slowly, or, if the circuit is arranged so that the condenser will discharge rapidly, it will charge very slowly.

Briefly, in accordance with the specific embodiment of this invention, a condenser is charged slowly during the time the contacts in question are closed but discharges rapidly when the contacts are open. The potential across the condenser is used to control an electron discharge device, preferably a gas-filled tube, and the electron discharge device controls an indicating device. If the contacts chatter appreciably, it takes the potential upon the condenser a considerably longer time to reach the critical value required to actuate the discharge device than if the contacts do not chatter. Thus, the electron discharge device will conduct current for a much greater period of time than when the contacts do not chatter.

The foregoing and other objects and features of this invention, the novel features of which are specifically set forth in the claims appended hereto, may be more readily understood from the following description when read with reference to the attached drawing in which:

Fig. 1 shows the circuit details of a specific embodiment of this invention; and Figs. 2, 3 and 4 show curves illustrating the operation of the arrangement for measuring the duration of contact chatter.

Referring now to Fig. 1, relay 22 represents the relay under test and contacts 19, the contacts, the duration of chatter or rebound of which it is desired to determine or measure.

The term "chatter," as referred to in this application, is intended to indicate the phenomenon of relay contacts which manifests itself by the contacts momentarily opening and closing a number of times after the relay has operated or released to close them. Thereafter, the contacts may open for short intervals of time before they finally close and remain closed. This chatter is due to a number of factors, including the mass of the armature and contact springs, resilience of the contact springs, the impact of the contact springs with each other and the impact of the armature against its stops, as well as the impact or contact springs against their stops. In certain cases it may be due to the impact and reaction between the armature and the contact springs or between contact springs themselves.

Relay 22, as shown in Fig. 1, is provided with a lower biasing circuit, the current flowing through which tends to operate the relay to its right-hand position. The upper or operating circuit of this relay is controlled by a key or interrupter 32 which, in the preferred embodiment of this invention, intermittently opens and closes the circuit through the upper winding of relay 22. The current flowing in the upper winding of this relay tends to operate relay 22 to its left-hand position and is of sufficient magnitude to overcome the effect of the current flowing through the lower winding of this relay and, hence, causes relay 22 to operate to the position shown in the drawing.

During the time the armature of relay 22 is in its right-hand position, the upper terminal of condenser 16 discharges through the copper oxide rectifier and resistance 18 and assumes the same potential as the lower terminal of this condenser which is connected to ground. This discharge current of condenser 16 flows through rectifier 17 in the pass or forward direction, that is, the direction in which the rectifier 17 tends to readily pass current. Hence, the impedance of rectifier 17 is quite low and the upper terminal of condenser 16 is therefore discharged and brought to ground potential in a very short interval of time after the armature of relay 22 leaves contact 19.

However, when the armature of relay 22 is operated to its left-hand position, as shown in the drawing, a positive potential obtained from source 21 through the potentiometer comprising resistances 20 is connected to the upper terminal of condenser 16 through the armature and the left-hand contact 19 of relay 22 and rectifier 17. This potential is applied to the upper terminal of condenser 16 through rectifier 17 so the upper terminal of condenser 16 tends to become charged to the same positive potential as contact 19, which potential is determined by the value of the source 21 and the values of resistances 18 and 20.

This charging current of condensers 16, however, must flow through rectifier 17 in its blocking or non-pass direction. Hence, rectifier 17 has a very high resistance to the flow of this charging current. Consequently, it requires a considerable interval of time for the charge on the upper terminal of condenser 16 to reach an appreciable positive value. If after relay 22 has been operated to its left-hand position and the armature and contacts 19 closed, these contacts momentarily reopen during a brief interval of time, the charge which has been acquired by the upper terminal of condenser 16 will rapidly discharge through the rectifier 17 and resistance 18 so that, when the contacts reclose, the charging cycle of condenser 16 will start again from the beginning.

This action of this circuit is illustrated by the curves in Figs. 2, 3 and 4. Fig. 2 shows the typical curve of current flowing through contact 19. The ordinate of this curve indicates the current flowing through the contact 19. As will be observed in this curve, the contacts momentarily opened four times after the first closure. The abscissa of this curve represents the time in milliseconds, as indicated below in Fig. 4. Thus, the first momentary open of contact 19 of its chatter occurred four milliseconds after the contacts closed and lasted for less than a half millisecond. The next open occurred approximately six milliseconds after the contacts closed while the third and fourth opens occurred seven and a little less than eight milliseconds after the contacts closed.

It will be observed, as explained above, that when the contacts close the potential of the upper terminal of condenser 16 starts to rise, due to the fact that this condenser is being charged at this time as described above. The curve 28 of Fig. 3 shows the manner in which the potential of the upper terminal of condenser 16 varies with time. The ordinates of this curve represent the potential of the upper terminal of condenser 16. Thus, during the first four milliseconds the potential rises rather slowly, then during the momentary open of the contacts the potential rapidly falls, then again rises during each of the succeeding periods during which the contact is closed and falls during the time the contact is open.

The potential across condenser 16 is used to control the potential responsive device which is an electron discharge tube 10. The input circuit is connected to condenser 16. The electron discharge device or tube 10 may be of any suitable type. In the embodiment shown in Fig. 1 this tube is a gas-filled tube of the thyratron type. It is to be understood, however, that any other type electron discharge device will operate equally satisfactorily. This device may be a three-element high vacuum discharge device as well as a four or five-element high vacuum tube. It may also be a multielement gas-filled tube. So far as this invention is concerned, the tubes of the various types all operate in substantially the same manner, in that they have an input circuit which controls an output circuit. In all of these types of tubes a small change in the potential applied to the input circuit causes a relatively large change in the output current. In the case of the high vacuum tubes, the input circuit is biased so that normally no output current flows. In the case of the gas-filled tubes, means must be provided in the output circuit for interrupting the discharge through the tube. These characteristics of the respective types of tubes are well known and understood by those skilled in the art.

A typical manner in which tubes of these types are employed in the present invention is illustrated by the gas-filled tube in Fig. 1. As pointed out above, the upper terminal of condenser 16 is normally maintained at ground potential during the time contact 19 is open and the armature of relay 22 is in its right-hand position. The cathode or electron emitting element of tube 10 is maintained at a positive value determined by the relative magnitudes of resistances 13 and 14 and the potential of source 15. Thus, the cathode 18 is positive with respect to the grid or control element. In other words, the grid is negative with respect to the cathode. Under these conditions, substantially no current flows in the output circuit of tube 10 through meter or indicator 23.

As the potential of the upper terminal of condenser 16 rises, as described above, when the armature of relay 22 moves to its left-hand position and closes contact 19, a critical potential is reached at which a discharge is initiated through tube 10. The current due to the discharge flows through meter 23 and causes a deflection of the meter. The dotted lines 29 of Fig. 3 show the wave form of the current passing through meter 23 under these conditions. As described above, curve 28 of Fig. 3 shows the wave form of the potential on the upper terminal of condenser 16 when contacts 19 chatter. Curve 30 of Fig. 4 shows a similar wave form of the potential or the manner in which the potential of the upper terminal of condenser 16 varies with time when contacts 19 do not chatter. Here dotted lines 31 illustrate the wave form of the current flowing through meter 23.

In obtaining the curves shown in Figs. 2, 3 and 4 an interrupter was provided or substituted for key 32 which alternately opened and closed the circuit. When the interrupter opens and the armature of relay 22 again moves to its left-hand position the circuit through the left-hand contacts and leads 27 causes a discharge through tube 10 to be extinguished. Hence, the current flowing through meter 23 falls to zero. A short time later when the interrupter 32 again recloses, the cycle will be repeated.

Meter 23 will read the average value of the current flowing through it which is proportional to the area under the dotted lines 29 and 31 of Figs. 3 and 4. Thus, as shown in Figs. 3 and 4, when there is no contact chatter, the current flows through meter 23 for almost twelve milliseconds whereas, when the contact chatter lasts for eight milliseconds, current flows through meter 23 for less than six milliseconds. Under these conditions meter 23 will indicate less than half as much current flow through it when the contacts chatter as when they do not chatter. Furthermore, the longer the period of contact chatter the shorter the period during which current will flow through meter 23 and hence, the less the meter will deflect.

Under any given set of circuit conditions it is quite easy to calibrate meter 23 so that it will read or directly indicate the length of time during which the contacts chatter.

By proper choice of the constants of condenser 16, resistance 18, rectifier 17, tube 10 and the bias applied thereto, it is possible to cause meter 23 to deflect a substantial amount only when the contact chatter does not exceed the duration for which the constants are chosen. It is also possible to fix these constants so that the tube does not discharge or flash if the contacts chatter for a period in excess of any fixed limit. Thus, the tube itself may be used as an indicator.

As described above, an extra contact is required to extinguish the discharge through tube 10. When this contact is not available an additional condenser 25, shown in Fig. 1, may be provided. The action of condenser 25 is to rapidly and repeatedly extinguish the discharge through tube 10 at a relatively high rate. This occurs during the time intervals indicated by the dotted curves 29 and 31 of Figs. 3 and 4, thus, again causing the current to be proportional to the area under these dotted lines and hence, producing a deflection of meter 23 proportional thereto. In case the electron discharge device 10 is one of the high vacuum type of tubes, both lead 27 and condenser 25 may be dispensed with because when input or control potential applied to grid or control member is reduced below a certain value the discharge through the tube will be interrupted.

An alternative arrangement also within the scope of this invention for extinguishing discharges through tube 10 is to substitute an alternating current for the source of current indicated by battery 24. Thus, during alternate half cycles, discharges through tube 10 will be extinguished and reinitiated so long as the potential upon the upper terminal of condenser 16 exceeds the critical value as described above. Here again, the current flowing through meter 23 and hence, the deflection of this meter will be proportional to the area under the dotted lines 29 and 31 of Figs. 3 and 4 and will indicate the duration of the contact chatter.

What is claimed is:

1. A device for measuring the duration of contact chatter upon the operation of relay contacts which comprises a circuit connected to the contact to be measured including a condenser, a charging path for said condenser through said contacts, a circuit for discharging said condenser independent of said contacts and a rectifier element connected in at least one of said circuits to retard the charging of said condenser without materially retarding the discharging of said condenser and a potentially operated device controlled by the potential on said condenser.

2. In a device for measuring the duration of contact chatter of a pair of operable contacts, a condenser, an operative connection between said condenser and said contacts including means comprising a rectifier for changing the charge on said condenser at one rate when the contacts close and at a different rate when the contacts open, and an electron discharge device controlled by the charge on said condenser.

3. A device for measuring the duration of contact chatter of a pair of operable contacts controlled solely by said contacts, comprising in combination a condenser, an operative connection between said condenser and said contacts including a rectifier for changing the charge on said condenser at one rate when said contacts close and at a different rate when said contacts open, a gaseous discharge device and an operative connection between said discharge device and said condenser for initiating discharges through said device during the time potential across said condenser is beyond a predetermined value.

4. A device for measuring the duration of contact chatter of a pair of operable contacts, comprising in combination a condenser, an operative connection between said condenser and said contacts including a rectifier for changing the charge on said condenser in one direction and at one rate when the contacts close and in the opposite direction and at a different rate when said contacts open, a gaseous conduction device, an operative connection between said device and said condenser for initiating discharges through said device during the time potential across said condenser is beyond a predetermined value, and means independent of said contacts for extinguishing discharges through said gaseous conduction device.

WILTON T. REA.